Figure 1A:
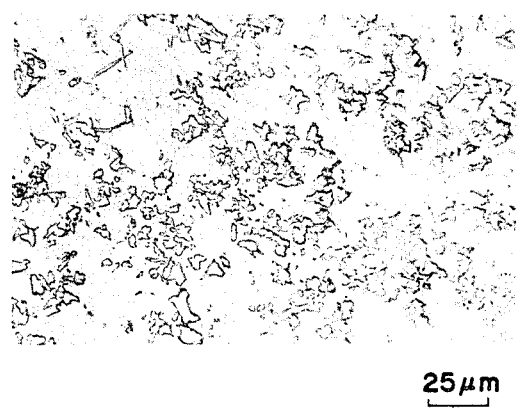

United States Patent [19]

Ueda et al.

[11] Patent Number: 4,590,035
[45] Date of Patent: May 20, 1986

[54] HIGH-HARDNESS HEAT-RESISTANT ALLOY

[75] Inventors: Jitsuhiko Ueda, Kobe; Yutaka Tomono, Ibaraki; Kazuhiko Tanaka, Osaka, all of Japan

[73] Assignee: Hitachi Zosen Corporation, Osaka, Japan

[21] Appl. No.: 698,446

[22] Filed: Feb. 5, 1985

[51] Int. Cl.$^4$ .............................................. C22C 19/05
[52] U.S. Cl. ................................................... 420/449
[58] Field of Search ....................... 420/446, 449, 450; 148/410, 428

[56] References Cited

U.S. PATENT DOCUMENTS 4,279,645  7/1981  Brown ................................. 420/449

Primary Examiner—R. Dean
Attorney, Agent, or Firm—Barnes, Kisselle, Raisch, Choate, Whittemore & Hulbert

[57] ABSTRACT

A high-hardness heat-resistant alloy comprising 13-17 wt % of Cr, 2-6 wt % of Al, 0.1-8 wt % of Mo, 1.5-3.5 wt % of B, 0.5-3 wt % of Ti, and 4-7 wt % of Co, the remaining components of the alloy being Ni and inevitable impurities. The alloy has high hardness and high strength at high temperatures and is therefore very suitable for use as a deposit or build-up welding material for exhaust valves in large low-speed diesel engines.

1 Claim, 4 Drawing Figures

25μm

25μm

25μm

HIGH-HARDNESS HEAT-RESISTANT ALLOY

This invention relates to high-hardness heat-resistant alloys, and more particularly to a high-hardness heat-resistant alloy suitable for use in exhaust valves in large low-speed diesel engines.

With large low-speed diesel engines, in which low-quality fuels are used, it is often experieced that combustion residues adhere to face-to-face contacting portions of a valve body and of a valve seat in an exhaust valve, so that dents or depressions may be created on the both contacting portions when the valve is closed. Once dents or depressions are so formed, the contacting portions may not be held in close contact relation when the exhaust valve is closed. Thus, under severe combustion conditions, combustion gases in the engine may cause blow bye through the dents or depressions, whereby the contacting portions may be further damaged. In view of this fact, it has been a usual practice to construct such contacting portions of a Co-base alloy or Ni-base alloy, which has high hardness and high heat-resistance (high-temperature strength), by deposit or build-up welding of such alloy material. With contacting portions of such construction, however, conventional exhaust valves are still not well protected against damages through dents and blow-bye. Another difficulty with such valve is that it is liable to thermal fatigue cracks, its service life being thus limited.

The object of this invention is to provide a high-hardness heat-resistant alloy which is free of the aforementioned drawbacks of the conventional alloys.

To this end, the invention provides a high-hardness heat-resistant alloy comprising 13–17 wt % of Cr, 2–6 wt % of Al, 0.1–8 wt % of Mo, 1.5–3.5 wt % of B, 0.5–3 wt % of Ti, and 4–7 wt % of Co, the remaining components of the alloy being Ni and inevitable impurities.

Figure 1B:
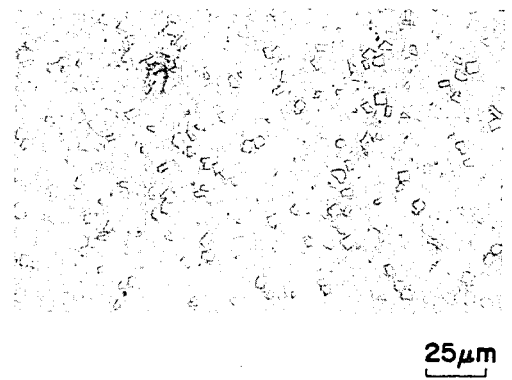
Figure 1C:
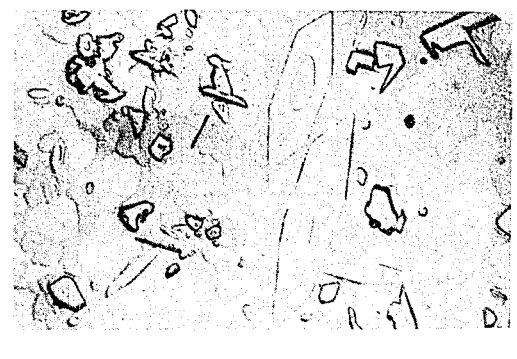
Figure 2:
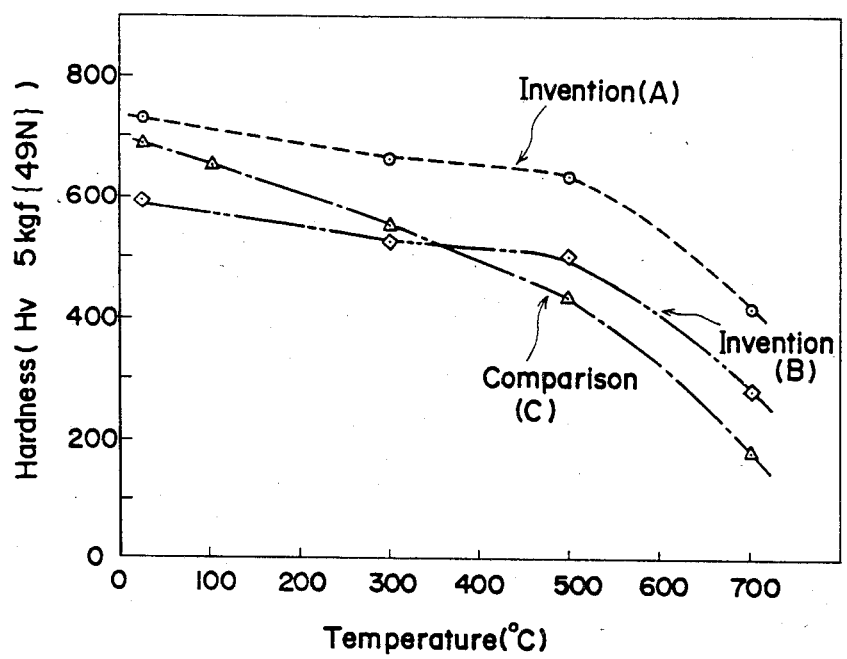

The invention will now be described in detail with reference to the accompanying drawings, in which:

FIGS. 1a–1c are microphotographic views showing microstructures of two types of alloys according to the invention and a comparative alloy; and FIG. 2 is a graphic representation showing hardness-temperature characteristics of said three type of alloys.

The high-hardness heat-resistant alloy in accordance with the invention has a chemical composition as shown in Table 1.

TABLE 1

| Component element | Cr | Al | Mo | B | Ti | Co | Ni |
|---|---|---|---|---|---|---|---|
| Content | 13–17 | 2–6 | 0.1–8 | 1.5–3.5 | 0.5–3 | 4–7 | the rest |

(wt %)

The proportions of the individual component elements in the alloy are specified as shown for the reasons described below.

Cr

Thirteen to seventeen percent by weight of Cr is necessary in order for it to combine with B to form a boride sufficient to provide good oxidation resistance and corrosion resistance. If the Cr content is less than 13 wt %, the alloy is less resistant to corrosion. If the Cr content is in excess of 17 wt %, the alloy is liable to embrittle.

Al

Two to six percent by weight of Al is necessary for formation of $Ni_3Al$ within the matrix in order to permit the alloy to maintain good high-temperature resistance. If the Al content is less than 2 wt %, no satisfactory high-temperature strength can be obtained. If the Al content is in excess of 6 wt %, the alloy has less favorable weldability.

Mo

Molybdenum combines with boron to form a boride, whereby it contributes toward improved hardness. It is noted, however, that only when the Mo content is not less than 0.1 wt %, it is effective in improving the hardness of the alloy, while no further improvement of hardness is expectable even if the Mo content is in excess of 8 wt %. In addition, the Mo is partially dispersed in the matrix to improve the high-temperature strength, or heat resistance, of the alloy.

B

A 1.5–3.5 wt % content of B is required for formation of dispersed boride particles or grains in order to provide improved hardness and abrasion resistance. If the B content is less than 1.5 wt %, the alloy has insufficient strength, while if the B content exceeds 3.5 wt %, the alloy is liable to embrittle.

Ti

Titanium is necessary for formation of $Ni_3Ti$ within the matrix in order to provide improved high-temperature strength. It is noted, however, that if the Ti is less than 0.5 wt %, no satisfactory high-temperature strength can be obtained, while if the Ti is in excess of 3 wt %, it results in less favorable weldability.

Co

Addition of Co is required to provide improved weldability. Co of less then 4 wt % provides insufficient weldability improvement and results in insufficient toughness of the alloy. The upper limit for the Co content is set at 7 wt % in the interest of economy.

Nextly, observations and measurements made with two types of high-hardness heat-resistant alloys (A), (B) according to the invention and a comparative alloy (C)—which respectively have such compositions as shown in Table 2—will be explained.

TABLE 2

| Component element | C | Cr | Al | Mo | B | Ti | Co | Si | Ni |
|---|---|---|---|---|---|---|---|---|---|
| Inventive alloy (A) | — | 15.0 | 5.0 | 2.0 | 3.0 | 1.5 | 6.0 | — | the rest |
| Inventive alloy (B) | — | 15.0 | 5.0 | 8.0 | 3.0 | 1.5 | 6.0 | — | the rest |
| Comparative alloy (C) (Hoganas 1-60) | 0.74 | 15.59 | — | — | 2.93 | — | — | 4.33 | the rest |

(wt %)

FIGS. 1a–1c are microphotographic views showing microstructures of the inventive alloys (A) and (B) and the comparative alloy (C) respectively. As is apparent from the photographs, the inventive alloys (A), (B) each has Cr- and Mo-borides dispersed in a Ni matrix containing Al and Ti more uniformly and densely than Cr-boride in the comparative alloy (C). Such greater and more uniform dispersion represents the effect of the Mo content, manifesting that the alloy retains high hardness at high temperatures, or in other words, it has high abrasion resistance.

FIG. 2 shows results of high-temperature hardness tests conducted with the inventive alloys (A), (B) and comparative alloy (C). It can be understood from the figure that the inventive alloy (A) has greater hardness than the comparative alloy (C) at temperatures ranging from room temperature to about 700° C., thus exhibiting excellent abrasion resistance. The inventive alloy (B) is lower in hardness than the comparative alloy (C) within a temperature range of from room temperature to about 350° C., but at higher temperatures the former exhibits higher hardness than the latter, which means greater abrasion resistance.

As Table 3 indicates, there is little difference in thermal expansion coefficient between the inventive alloy (A) or (B) and the comparative alloy (C), all the alloys being less subject to thermal expansion. By comparing Tables 2 and 3 it may be appreciated that in the case of the inventive alloys (A), (B) the thermal coefficient can be reduced by increasing the Mo content from 2 wt % to 8 wt %.

TABLE 3

|  | Thermal expansion coefficient (373–973 ° K.) |
| --- | --- |
| Inventive alloy (A) | $14.4 \times 10^{-6} K^{-1}$ |
| Inventive alloy (B) | $13.6 \times 10^{-6} K^{-1}$ |
| Comparative alloy (C) (Hoganas) | $13 \times 10^{-6} K^{-1}$ |

What is claimed is:

1. A high-hardness heat-resistant alloy consisting of 13–17 wt % of Cr, 2–6 wt % of Al, 0.1–8 wt % of Mo, 1.5–3.5 wt % of B, 0.5–3 wt % of Ti, and 4–7 wt % of Co, the remaining components of the alloy being Ni and inevitable impurities.

* * * * *